Nov. 22, 1932.   L. DE FOREST   1,888,910
MEANS FOR SECURING SYNCHRONIZATION IN TALKING MOTION PICTURE PHOTOGRAPHY
Filed June 7, 1924   3 Sheets-Sheet 1

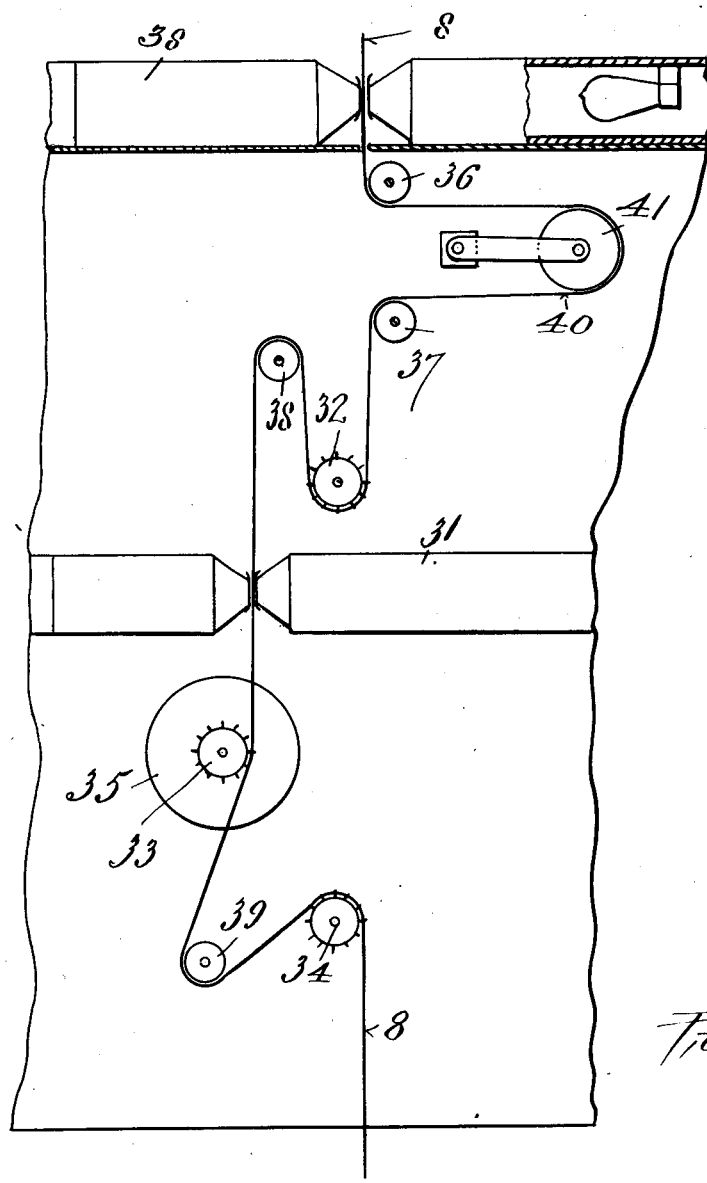

Patented Nov. 22, 1932

1,888,910

UNITED STATES PATENT OFFICE

LEE DE FOREST, OF NEW YORK, N. Y., ASSIGNOR, BY MESNE ASSIGNMENTS, TO GENERAL TALKING PICTURES CORPORATION, A CORPORATION OF DELAWARE

MEANS FOR SECURING SYNCHRONIZATION IN TALKING MOTION PICTURE PHOTOGRAPHY

Application filed June 7, 1924. Serial No. 718,642.

This invention relates to the phonofilm or talking motion picture art, and has for its principal object the provision of means for insuring synchronization, especially in reproduction, between the sound record and the picture record.

A further object of the invention is to provide an apparatus for securing this result, which is simple in structure and procedure, efficient and effective in operation and economical of manufacture, application and maintenance.

Further objects of the invention will appear more fully hereinafter.

The invention consists substantially in the construction, combination, location and relative arrangement of parts, as well as the procedure employed in connection therewith, all as will be more fully hereinafter set forth, as shown by the accompanying drawings and finally pointed out in the appended claims.

Referring to the drawings:—

Fig. 3 is a diagrammatic view illustrating a portion of a motion picture projection machine with the principles of my invention applied thereto.

The same part is designated by the same reference character wherever it occurs throughout the several views.

It is among the special purposes of my present invention to provide an apparatus for insuring at all times perfect synchronization between the sound record and the picture record in the talking motion picture art.

In talking motion picture projection machines, it is customary to have the sound reproducing apparatus as well as the picture projecting apparatus located one above the other so that the film in its normal passage through the projection machine first encounters either one or the other. Therefore, where the sound record and the picture record are provided on the same film, as is customary in the phonofilm art, means must be taken to separate the sound record incident to any particular picture exposure from the picture record by a distance equal to the distance between the sound reproducing mechanism and the picture reproducing mechanism of the projection machine. In other words, the sound reproduction of a particular scene of the picture record must of necessity be secured from a portion of the film different from that portion of the film which is opposite to the projection lens. Therefore to secure perfect synchronization between sound reproduction and picture reproduction some means must be taken to compensate for the distance between the sound reproducing mechanism and the projection lens of the projection machine.

Figure 1:
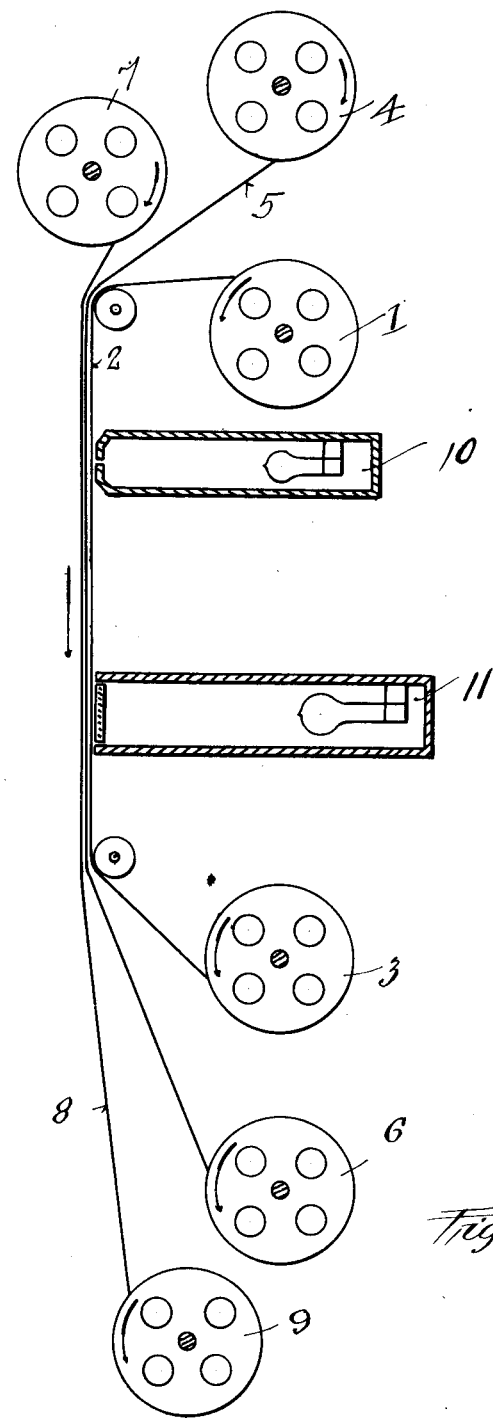
Fig. 1 is a diagrammatic illustration of a printing arrangement employed in accordance with my invention as one step of the procedure of securing perfect synchronization between the sound and picture records.

In the arrangement of Fig. 1, I have shown a simple arrangement for securing this result in printing the talking motion picture film positive. In this arrangement reference character 1 designates the reel containing the negative 2 of the sound record which is wound up on take-up reel 3. Reel 4 contains the negative 5 of the picture record taken up by reel 6, and reel 7 contains the stock of undeveloped positive 8 which is taken up by take-up reel 9. The negative films 2 and 5 and up reel 9. The negative films 2 and 5 and the positive film 8 are fed simultaneously past the printing mechanism 10 and 11, of which 10 is diagrammatic of the sound printing light case and 11 is diagrammatic of the picture printing light case. Thus, it will be seen that as the negatives 2 and 5 pass by the respective printing devices 10 and 11, there will be exposed to the undeveloped stock or positive film 8 as it passes the sound printing device 10, the sound record on the negative film 2, and as it passes the picture printing mechanism 11 the picture record on the negative film 5. In this way, for all practical purposes, simultaneously printing of the sound and picture records is effected on the positive 8.

To insure proper synchronization in the projection machine, I separate the printing of the sound record on the positive film from the printing of the picture record on the positive film by a distance equal to the distance between the sound reproducing mechanism and the picture projection mechanism of the motion picture projection machine. This may be accomplished in any one of a number of ways, several of which I have illustrated.

One way which may be employed when the light and sound printing cases 10 and 11 are positioned closely adjacent to each other, where printing from independent sound negative and picture negative on a single positive is desired, is to start the travel of the picture negative in advance of the start of travel of the sound negative a distance equal to the distance between the sound reproducing mechanism and the picture reproducing mechanism of the projection machine. In this way the sound and picture records while on the same positive film are separated from each other by a physical distance on the film equal to the footage travel of the picture negative in advance of the commencement of travel of the sound record negative which, as above explained, is controlled so as to be equal in distance to the distance between the sound reproducing mechanism and the motion picture projection mechanism of the projection machine.

Another way in which this result may be accomplished is to separate the printing light cases 10 and 11 from each other a distance equal to the distance between the sound reproducing mechanism and the picture projecting mechanism of the projection machine.

Figure 2:
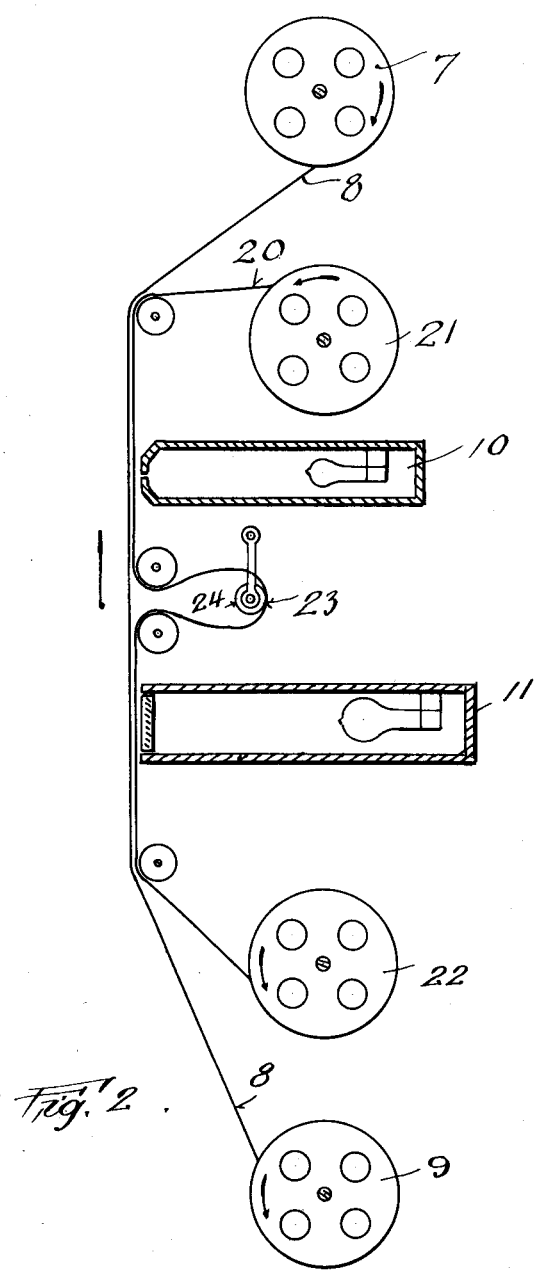
Fig. 2 is a similar view showing a modified arrangement for producing the talking motion picture positive.

In Fig. 2 I show a somewhat modified arrangement for accomplishing the same purpose, where the sound and picture record are on the same negative film. In this arrangement the sound and picture negative 20 is carried on reel 21 having its take-up reel 22, and the positive stock 8 is carried on reel 7 with its take-up reel 9, and the sound printing mechanism 10 and picture printing mechanism 11 are provided in substantially the same arrangement as illustrated in Fig. 1. This arrangement differs from the one shown and described in connection with Fig. 1 in that a loop 23 is made in the negative film so that the time of printing the picture from the negative 20 on the positive 8, with respect to the time and location of printing the sound record from the negative 20 on to the positive 8 may be controlled in accordance with the size of the loop 23. For this purpose the loop forming idler 24 is made adjustable as to its location.

In Fig. 3 I have diagrammatically illustrated the light reproducing mechanism and the projecting mechanism of a projection machine. This illustration is not given with any degree of accuracy as to the construction or location of the respective elements of a standard motion picture projection machine, but merely to illustrate the principles involved in the present invention with respect thereto. In the illustration therefore the phonofilm attachment or reproducing mechanism for the photographically recorded sound waves is illustrated at 30. The picture projection mechanism or lens, as diagrammatically illustrated, is designated by reference character 31. The intermittent feed sprockets are shown at 32, 33 and 34, the sprocket 33 being on the same shaft with the usual fly wheel 35. The positive film 8 is passed through the machine from the top over the usual idler rollers 36, 37, 38 and 39, being drawn through the machine by the operation of the intermittent feed sprockets, as in the usual practice. To insure synchronization between the reproduction from the film of the picture thereon by the mechanism 31 with the reproduction of the sound record thereon from the mechanism 30, I provide a loop 40, the size of which is adjustably controlled by a roller 41, to control the distance between the sound reproduction and the picture reproduction mechanism, in accordance with the distance separating the records thereof on a positive film.

Many other modifications and changes in details will readily occur to those skilled in the art without departing from the spirit and scope of my invention as defined in the claims, and I therefore desire to have the foregoing description and drawings used in connection therewith regarded in the illustrative sense rather than in a limiting sense; but, having now set forth the objects and nature of my invention, and having shown and described a structure embodying the principles thereof, what I claim as new and useful and of my own invention and desire to secure by Letters Patent is:

1. A printing machine for printing positives from negatives having sound and motion picture records displaced thereon, comprising means for printing the sound record from the negative onto the positive, mechanism displaced from the said means for printing the picture record from the negative onto the positive, and instrumentalities arranged between the said means and mechanism for predetermining the displacement between the sound and picture records on the positive.

2. A printing machine for printing a combined positive picture and sound record film having said records spaced any desired distance thereon from a single negative having picture and sound records thereon comprising means for printing the picture record from the negative onto the positive, means for printing the sound record from the negative onto the positive, and means for causing one of said films to travel through a longer path than the other in passing from the picture printing means to the sound printing means to effect a desired separation between the two records on the positive film.

In testimony whereof I have hereunto set my hand on this 31st day of May A. D., 1924.

LEE DE FOREST.